United States Patent
Boxwell et al.

(10) Patent No.: US 11,568,234 B2
(45) Date of Patent: Jan. 31, 2023

(54) TRAINING A NEURAL NETWORK BASED ON TEMPORAL CHANGES IN ANSWERS TO FACTOID QUESTIONS

(71) Applicant: International Business Machines Corporation, Armonk, NY (US)

(72) Inventors: Stephen A. Boxwell, Columbus, OH (US); Kyle M. Brake, Dublin, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 1113 days.

(21) Appl. No.: 16/191,754

(22) Filed: Nov. 15, 2018

(65) Prior Publication Data

US 2020/0160166 A1   May 21, 2020

(51) Int. Cl.
*G06K 9/62* (2022.01)
*G06N 3/08* (2006.01)
*G06F 17/18* (2006.01)
*G06F 16/35* (2019.01)
*G06F 16/33* (2019.01)
*G06F 16/9535* (2019.01)
*G06F 16/332* (2019.01)
*G06V 20/52* (2022.01)
*G06V 10/82* (2022.01)

(52) U.S. Cl.
CPC .......... *G06N 3/08* (2013.01); *G06F 16/3329* (2019.01); *G06F 16/3349* (2019.01); *G06F 16/355* (2019.01); *G06F 16/9535* (2019.01); *G06F 17/18* (2013.01); *G06K 9/62* (2013.01); *G06K 9/6217* (2013.01); *G06V 10/82* (2022.01); *G06V 20/52* (2022.01)

(58) Field of Classification Search
CPC ...... G06N 3/08; G06N 3/0427; G06N 3/0454; G06N 3/084; G06N 5/041; G06F 16/3329; G06F 16/3349; G06F 16/355; G06F 16/9535; G06F 17/18; G06K 9/62; G06K 9/6217; G06V 10/82; G06V 20/52; G06V 10/764; G06V 10/776; G06V 40/103

See application file for complete search history.

(56) References Cited

U.S. PATENT DOCUMENTS

| | | | |
|---|---|---|---|
| 9,965,971 | B2 | 5/2018 | Bagchi et al. |
| 9,996,604 | B2 | 6/2018 | McCloskey et al. |
| 10,055,488 | B2* | 8/2018 | Alkov .................. G06F 16/243 |
| 10,586,156 | B2* | 3/2020 | Merdivan ........... G06F 16/3329 |

(Continued)

OTHER PUBLICATIONS

P. Mell et al., "The Nist Definition of Cloud Computing", National Institute of Standards and Technology, Information Technology Laboratory, Sep. 2011, pp. 1-7.

*Primary Examiner* — Samir A Ahmed
(74) *Attorney, Agent, or Firm* — Stephanie L. Carusillo (57) ABSTRACT

A method trains a neural network to identify an event based on discrepancies in answers to factoid questions at different times. One or more processors identify answers to a series of factoid questions. The processor(s) compare the answers from the series of factoid questions in order to determine discrepancies in the answers at different times, and then train a neural network to identify an event based on the discrepancies in the answers at the different times.

20 Claims, 7 Drawing Sheets

(56) References Cited

U.S. PATENT DOCUMENTS

| | | |
|---|---|---|
| 2008/0167960 A1 | 7/2008 | Hughes |
| 2011/0125734 A1 | 5/2011 | Duboue |
| 2012/0077178 A1 | 3/2012 | Bagchi |
| 2016/0034457 A1* | 2/2016 | Bradley ............ G06F 16/24578 707/749 |
| 2016/0196504 A1* | 7/2016 | Allen ..................... G06N 20/00 706/11 |
| 2016/0378851 A1* | 12/2016 | Merdivan ........... G06F 16/9024 707/728 |
| 2017/0109390 A1* | 4/2017 | Bradley ................ G06F 16/335 |
| 2017/0132317 A1* | 5/2017 | Alkov .................. H04L 51/046 |
| 2017/0372190 A1* | 12/2017 | Bishop ................. G06F 40/295 |
| 2018/0150750 A1* | 5/2018 | Verdejo ................. G06V 10/84 |

* cited by examiner

TRAINING A NEURAL NETWORK BASED ON TEMPORAL CHANGES IN ANSWERS TO FACTOID QUESTIONS

BACKGROUND

The present invention relates to the field of neural networks. Still more specifically, the present invention relates to the field of training and/or utilizing a neural network based on time-based (temporal) changes to answers to factoid questions.

SUMMARY

In an embodiment of the present invention, a method trains a neural network to identify an event based on discrepancies in answers to factoid questions at different times. One or more processors identify answers to a series of factoid questions. The processor(s) compare the answers from the series of factoid questions in order to determine discrepancies in the answers at different times, and then train a neural network to identify an event based on the discrepancies in the answers at the different times.

In an embodiment of the present invention, the processor(s) modify a hardware device based on the event that is identified by the neural network.

In one or more embodiments, the method(s) described herein are performed by an execution of a computer program product and/or a computer system.

DETAILED DESCRIPTION

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

Figure 1:
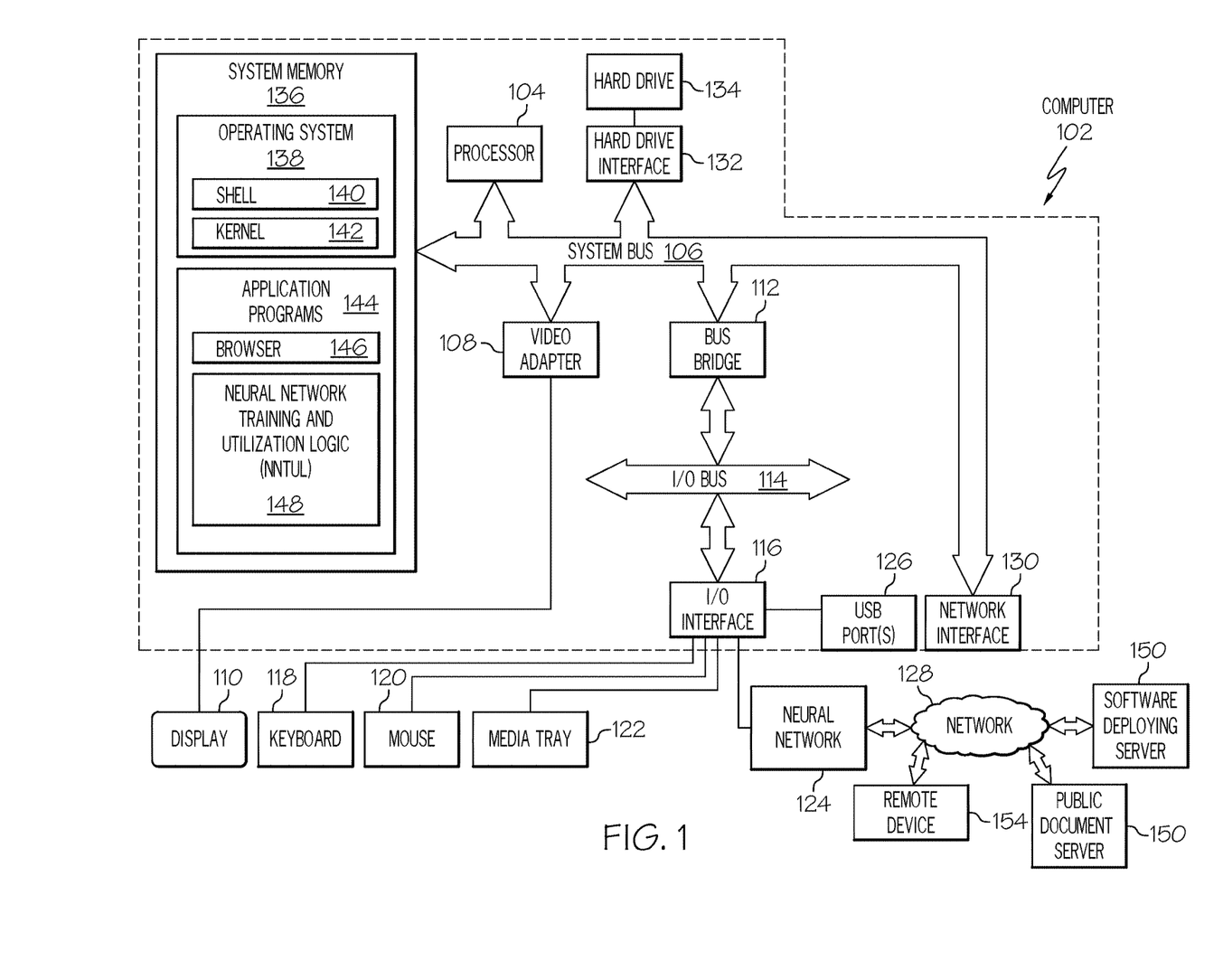
FIG. 1 depicts an exemplary system and network in which the present invention may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or public document server 152 and/or remote device 154 and/or neural network 124.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a neural network 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or the public document server 152 and/or the remote device 154 and/or the neural network 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Neural Network Training and Utilization Logic (NNTUL) 148. NNTUL 148 includes code for implementing the processes described below, including those described in FIGS. 2-5. In one embodiment, computer 102 is able to download NNTUL 148 from software deploying server 150, including in an on-demand basis, wherein the code in NNTUL 148 is not downloaded until needed for execution. Note further that, in one embodiment of the present invention, software deploying server 150 performs all of the functions associated with the present invention (including execution of NNTUL 148), thus freeing computer 102 from having to use its own internal computing resources to execute NNTUL 148.

Also connected to (or alternatively, as part of) computer 102 is a neural network 124. In exemplary embodiments of the present invention, neural network 124 is a traditional neural network (see FIG. 4), a convolutional neural network, or another type of heuristic artificial intelligence.

Also connected to computer 102 is a public document server 152, which serves documents that are available to the public. Examples of documents that are served by public document server 152 include, but are not limited to, news reports generated by the mass media (e.g., newspapers, magazines, electronic news services, etc.), reports generated by enterprises for public consumption (e.g., company news bulletins), etc.

Also connected to computer 102 is a remote device 154. One or more examples of remote device 154 are presented in FIG. 3.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

As described herein, one or more embodiments of the present invention identify hidden events through periodic and/or continuous corpus monitoring using sliding temporal windows. That is, one or more embodiments monitor answers to certain questions at different times in order to determine if the answers change. If the answers change, then a hidden event is inferred.

When using a factoid-style Question/Answer (QA) system, literal answers are given to literal questions. For example, in a factoid question (i.e., a question that asks for a specific answer to a specific question, rather than asking a non-specific open-ended question) such as "Where is Public Leader A", given a corpus of recent news articles, a literal answer would be "Public Leader A is in Paris" if a passage from a recent new article reported "Public Leader A visited Paris". However, this literal QA does not extract more useful information such as "There are many world leaders gathering in Paris right now". An answer such as this requires a lengthy series of questions that ask the correct questions that lead to such an answer.

Thus, in an embodiment of the present invention, a user enumerates a set of questions (e.g., "Where is Public Leader A"; "Where is Public Leader B"). Each question from these question sets is then run over a series of corpus subsets (e.g., passages from different news reports), where each corpus subset is denoted by a temporal window (i.e., the corpus subsets are written, published, released, etc. at different times/days/etc.). Question subsets where a disproportionate number of questions exhibit differences in answer ordering trigger an event that can then trigger a particular action. For example, if there are one hundred questions asking for the whereabouts of one hundred different persons, and the answer to ten of those questions change between yesterday and today, then this will trigger the identification of a particular event (e.g., these ten persons are meeting today in a particular city in order to discuss a political or economic or other activity), which leads to the execution of a particular action (e.g., modifying a physical device such as a traffic controller in order to afford improved security to these ten high-profile persons when moving about that particular city).

For the purposes of explaining an exemplary embodiment of the present invention, assume that the invention uses a small set of formulaic questions (predefined according to a certain parameter), even though the present invention functions equally well for arbitrary questions. Examples of formulaic questions are questions that ask where a particular person is, what that particular person is doing, why that particular person is doing some specific action or is at some particular location, etc. Although the present invention is described primarily as asking formulaic questions about certain public persons and/or types of public persons (e.g., political leaders, business leaders, etc.), the principles and method described herein are also useful when asking formulaic questions about computers (e.g., questions about what types of operations are currently being performed by certain computers, what resources are being used by specific computers, etc.), equipment (e.g., questions about what is the state of a pump in a refinery), etc.

For purposes of explanation now, assume that the formulaic questions being asked are:
Where is Public Person A currently?
Where is Public Person B currently?

For example, assume that "Public Person A" is the prime minister of Country A, and "Public Person B" is the president of Country B.

Assume furthermore that a corpus of public documents (e.g., mass media reports, publicly published social media postings, etc.) from the past (e.g., yesterday) consists of many references to Public Person A being in Country A, and Public Person B being in Country B. Assume further that a series of new media articles are published on the current date (i.e., today), and include an article about Public Person A being in Country C to meet with President C of Country C. Assume that the series of new media articles published on the current date also include a report that Public Person B is meeting today with Speaker C of the House of Representatives in Country C. When a question/answer (QA) system is restricted to only evaluating articles published on the current date (today), the answers to the questions in the questions "Where is Public Person A currently?" and "Where is Public Person B currently?" change dramatically.

Assume now that there are not merely two articles being evaluated when answering the questions "Where is Public Person A currently?" and "Where is Public Person B currently?", but rather there are numerous (e.g., tens or hundreds or thousands of) articles being evaluated when answering the questions "Where is Public Person A currently?" and "Where is Public Person B currently?". Assume further that the top n answers are those that 1) are in agreement, and 2) change in a sufficiently dramatic fashion. That is, assume that the top n answers 1) all agree that Public Person A and Public Person B are in Country C today, and 2) that Public Person A and Public Person B were both in their respective home countries Country A and Country B yesterday. These top n answers cause an event to be triggered, which will allow an analyst and/or the computer system and/or the neural network described herein to review these top n answer documents and/or other supporting documents, in order to conclude that Public Person A, Public Person B, and leaders of Country C are involved in some type of interaction (e.g., negotiating a trade treaty) that is not explicitly stated in any particular document.

Continuing with the example of the questions "Where is Public Person A currently?" and "Where is Public Person B currently?", let B be a vector representing pairs of answers and their scores above some threshold (e.g., the top 5 answers) at time T1 (e.g., yesterday), which have been produced using documents from a first temporal window (e.g., yesterday). Now, let $\vec{C}$ be a vector representing pairs of answers and their scores above some threshold (e.g., the same threshold used by $\vec{B}$) at time T2 (e.g., today), which have been produced using documents from a second temporal window (e.g., today).

The system then calculates the average (mean) of the squares of the differences between each value in vector $\vec{B}$ and vector $\vec{C}$.

For example, assume that a particular question (e.g., "Where is Public Person A currently?") has the following baseline vector $\vec{B}$ at time T1:
Berlin: 0.98
Paris: 0.30
London: 0.28
Dublin: 0.25
Washington: 0.22

Assume further that the vector $\vec{C}$ at time T2 has the following values:
Berlin: 0.91
Istanbul: 0.75
Paris: 0.28
Dublin: 0.1
Washington: 0.09

In this example, some of the parameters (e.g., Berlin) match in both vectors, while other parameters (e.g., London) do not appear in both vectors.

As such, the average (mean) of the squares of the differences between each value between the two vectors is:

$$(0.98-0.91)^2+(0.3-0.28)^2+(0.28-0)^2+(0.25-0.1)^2+ (0.22-0.09)^2+(0-0.75)^2=0.6856$$

The final score (0.6856) is then compared to a tuning parameter (i.e., a minimum score such as 0.5). If the final score exceeds the tuning parameter, then an event is triggered as described herein.

Figure 2:
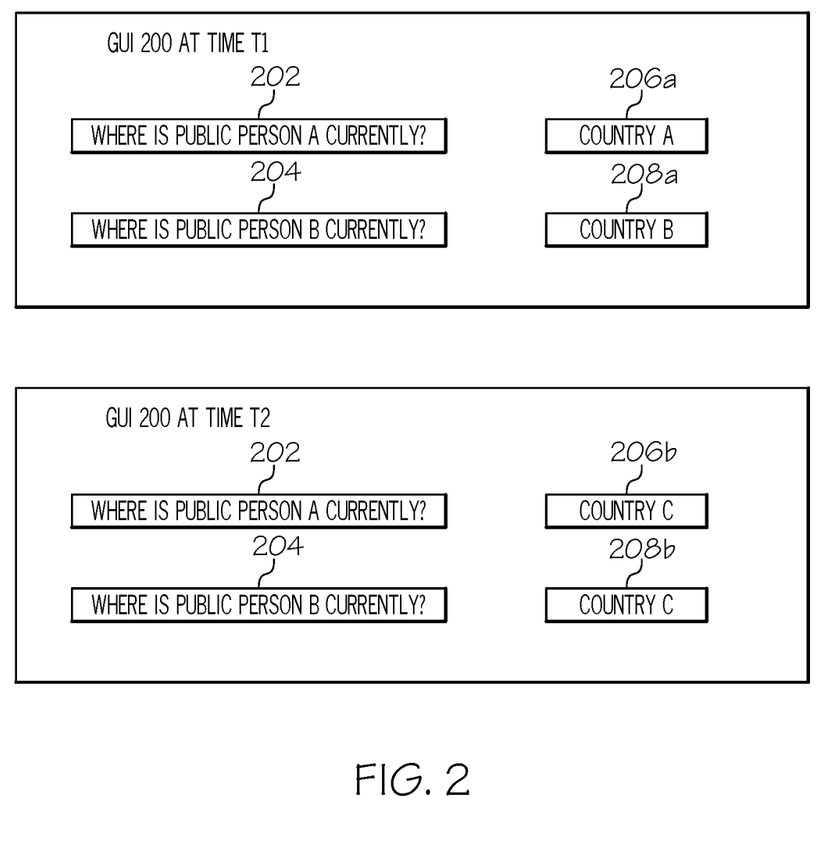
FIG. 2 illustrates a graphical user interface used in one or more embodiments of the present invention.

With reference now to FIG. 2, assume that a user has entered into block 202 on graphical user interface (GUI) 200 the question "Where is Public Person A currently?" at time T1 (e.g., yesterday). As shown in block 206a, the system (e.g., computer 102 and/or the neural network 124 shown in FIG. 1) analyzes public documents in order to identify the top n answers, which include the ultimate top answer "Country A" to the question in block 202.

Similarly, assume that a user has entered into block 204 on GUI 200 the question "Where is Public Person B currently?" at time T1. As shown in block 208a, the system (e.g., computer 102 and/or the neural network 124 shown in FIG. 1) analyzes public documents in order to identify the top n answers, which include the ultimate top answer of "Country B" to the question in block 204.

As shown in the same GUI 200 at time T2 (e.g., today), the answer to the question "Where is Public Person A currently?" in block 202 is now "Country C", as shown in block 206b, and the answer to the question "Where is Public Person B currently?" in block 204 is now also "Country C", as shown in block 208b. These new answers lead the system to determine not only that both Public Person A and Public Person B are in Country C, but also that they are likely meeting to discuss a political, economic, etc. issue with the leaders of Country C.

Since the presence of Public Person A and Public Person B in Country C potentially poses a threat to their security, in one or more embodiments the system (e.g., computer 102 shown in FIG. 1) accordingly adjusts one or more physical remote devices (e.g., remote device 154 shown in FIG. 1) based on this exposure.

Figure 3:
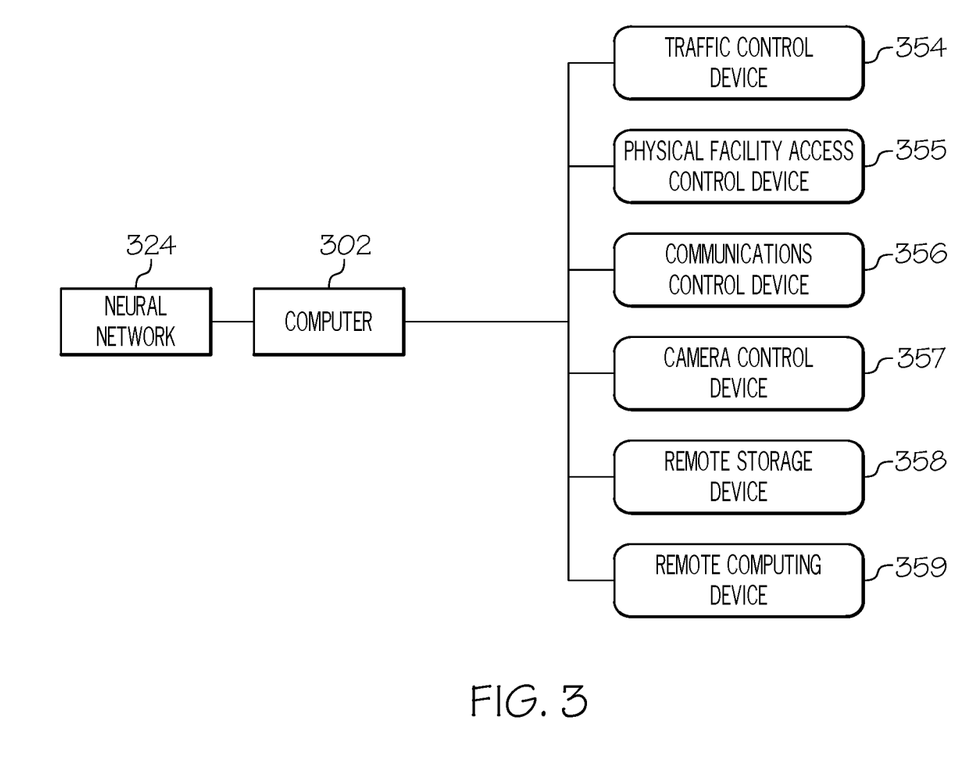
FIG. 3 depicts a connective relationship between a controlling computer and one or more control devices used in one or more embodiments of the present invention.

For example, and as shown in FIG. 3, assume that computer 302 (analogous to computer 102 shown in FIG. 1) and/or neural network 324 (analogous to neural network 124 shown in FIG. 1) have determined that Public Person A and Public Person B are potentially exposed to a security threat while in Country C. As such, security enterprises within Country C will use computer 302 to control various devices that are related to the security of Public Person A and Public Person B while in Country C.

For example, assume that a traffic control device 354 (analogous to remote device 154 shown in FIG. 1) controls traffic lights in Country C. As such, while Public Person A and Public Person B are in Country C, computer 302 will direct the traffic control device 354 (e.g., traffic controllers that change the traffic lights) to control traffic lights in order to reduce the security risk to Public Person A and Public Person B. For example, assume that the neural network 324 and/or computer 302 have determined, based on the public document analysis described above, that Public Person A and Public Person B will be traveling to the offices of the leaders of Country C in order to have a meeting. Even though this meeting has not been disclosed, the system will pre-emptively control the traffic lights around the offices of the leaders of Country C such that traffic is diverted away from the area around the offices of the leaders of Country C as long as Public Person A and Public Person B are publicly reported to be in Country C.

In another embodiment of the present invention, assume that a physical facility access control device 355 (also analogous to remote device 154 shown in FIG. 1) controls bollards, barricades, gates, etc. around offices of leaders of Country C. As such, while Public Person A and Public Person B are in Country C, computer 302 will direct the physical facility access control device 355 to control such facility access control devices in order to reduce the security risk to Public Person A and Public Person B. For example, assume that the neural network 324 and/or computer 302 have determined, based on the public document analysis described above, that Public Person A and Public Person B will be traveling to the offices of the leaders of Country C in order to have a meeting. Even though this meeting has not been disclosed, the system will pre-emptively control the facility access control devices around the offices of the leaders of Country C such that traffic is not allowed to approach the offices of the leaders of Country C as long as Public Person A and Public Person B are publicly reported to be in Country C.

In another embodiment of the present invention, assume that a communications control device 356 (also analogous to remote device 154 shown in FIG. 1) controls cell phone towers found on travel routes to offices of leaders of Country C and/or around the offices of leaders of Country C. As such, while Public Person A and Public Person B are in Country C, computer 302 will direct the communications control device 356 to be turned off in order to reduce the security risk to Public Person A and Public Person B. For example, assume that the neural network 324 and/or computer 302 have determined, based on the public document analysis described above, that Public Person A and Public Person B will be traveling to the offices of the leaders of Country C in order to have a meeting. Even though this meeting has not been disclosed, the system will pre-emptively control the cell phone towers leading to and/or around the offices of the leaders of Country C such that a cell phone cannot be used to trigger a dangerous device, and/or report movement of Public Person A and/or Public Person B, etc. as long as Public Person A and Public Person B are publicly reported to be in Country C.

In another embodiment of the present invention, assume that a camera control device 357 (also analogous to remote device 154 shown in FIG. 1) controls cameras along a route to and around offices of leaders of Country C. As such, while Public Person A and Public Person B are in Country C, computer 302 will direct the camera control device 357 to control such cameras in order to reduce the security risk to Public Person A and Public Person B. For example, assume that the neural network 324 and/or computer 302 have determined, based on the public document analysis described above, that Public Person A and Public Person B will be traveling to the offices of the leaders of Country C in order to have a meeting. Even though this meeting has not been disclosed, the system will pre-emptively turn off cameras leading to and/or around the offices of the leaders of Country C as long as Public Person A and Public Person B are publicly reported to be in Country C.

In another embodiment of the present invention, assume that a remote storage device 358 (also analogous to remote device 154 shown in FIG. 1) is a data storage device. As such, while Public Person A and Public Person B are in Country C, computer 302 will direct the remote storage device 358 to be turned off in order to reduce the security risk to Public Person A and Public Person B. For example, assume that the neural network 324 and/or computer 302 have determined, based on the public document analysis described above, that Public Person A and Public Person B will be traveling to the offices of the leaders of Country C in order to have a meeting. Assume further that the remote storage device 358 includes information about the travel itinerary (e.g., hotel location, flight information, etc.) about Public Person A and/or Public Person B. As such, even though this meeting has not been disclosed, the system will pre-emptively turn off or otherwise limit access to the data storage device as long as Public Person A and Public Person B are publicly reported to be in Country C.

In another embodiment of the present invention, assume that a remote computing device 359 (also analogous to remote device 154 shown in FIG. 1) is used to control communications (e.g., emails) for Public Person A and/or Public Person B. As such, while Public Person A and Public Person B are in Country C, computer 302 will direct the remote computing device 359 to be rendered unavailable to a network (e.g., by turning off network ports in the remote computing device 359) in order to reduce the security risk to Public Person A and Public Person B. For example, assume that the neural network 324 and/or computer 302 have determined, based on the public document analysis described above, that Public Person A and Public Person B will be traveling to the offices of the leaders of Country C in order to have a meeting. Assume further that the remote computing device 359 is an email server used by Public Person A and/or Public Person B. As such, even though this meeting has not been disclosed, the system will pre-emptively turn off or otherwise limit access to the email server to aides to Public Person A and/or Public Person B, in order to prevent information about the whereabouts of Public Person A and/or Public Person B from being disclosed as long as Public Person A and Public Person B are publicly reported to be in Country C.

In one or more embodiments, the present invention uses an electronic neural network, such as the neural network 124 shown in FIG. 1, to identify a non-obvious event using persona descriptor data as inputs. In various embodiments of the present invention, the neural network 124 shown in FIG. 1 is a Traditional Neural Network (TNN), a Convolutional Neural Network (CNN), and/or another type of machine learning system. In a preferred embodiment, a TNN is used to evaluate text/numeric data about public persons, while a CNN is used to evaluate an image of public persons.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a TNN, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

Figure 4:
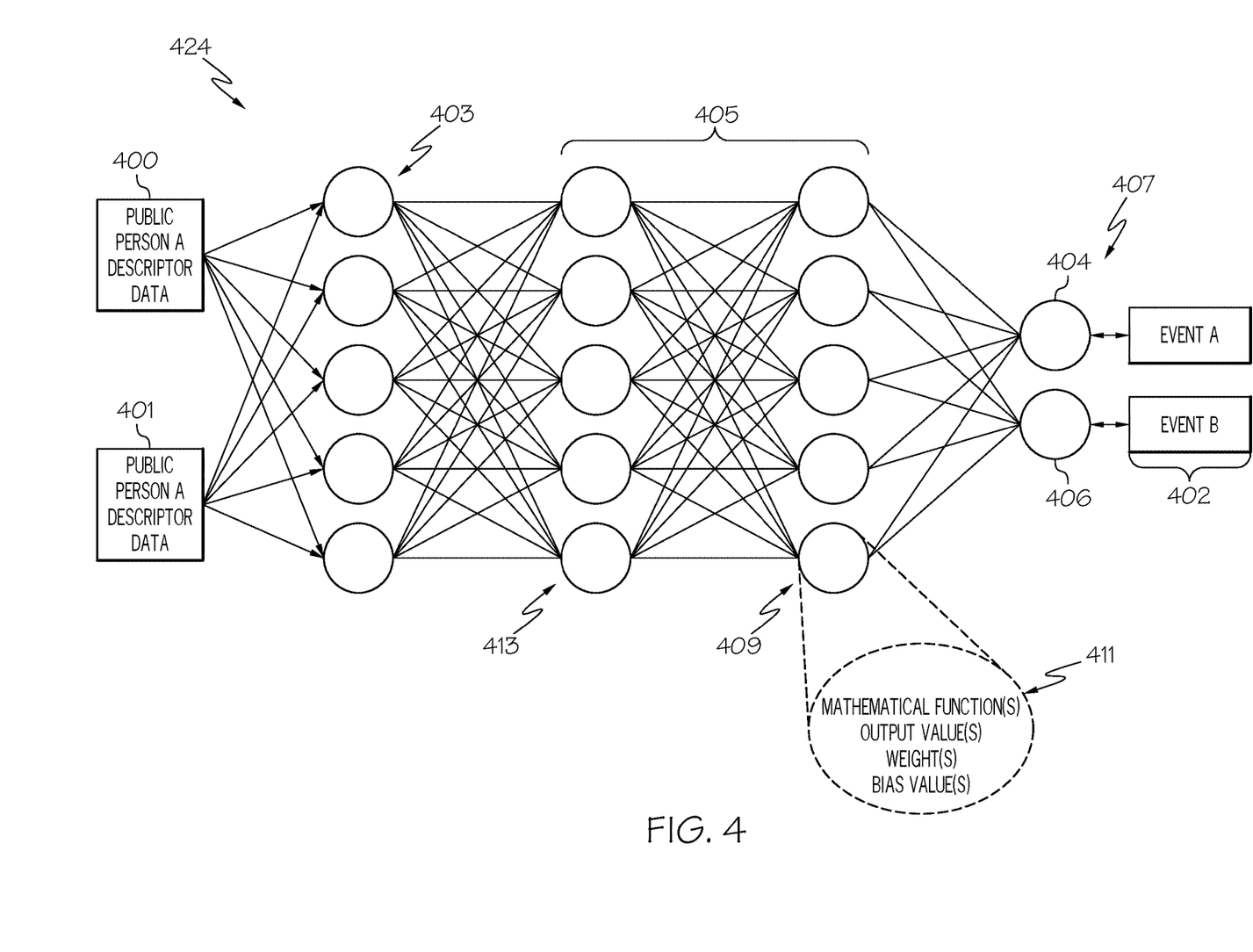
FIG. 4 depicts an exemplary traditional neural network as used in one or more embodiments of the present invention.

With reference now to FIG. 4, a Traditional Neural Network (TNN) 424 used to evaluate textual data in one or more embodiments of the present invention is presented. For example, assume, for illustrative purposes, that Public Person A descriptor data 400 is text and/or data that describes features of a first Public Person A, including but not limited to information about his/her current location as reported in public news enterprises, social media, etc. Assume further, for illustrative purposes, that Public Person B descriptor data 401 is text and/or data that describes features of a Public Person B, including but not limited to information about his/her current location as reported in public news enterprises, social media, etc.

The electronic neurons in TNN 424 are arranged in layers, known as an input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information. In an embodiment of the present invention, each neuron in the output layer 407 is associated with a particular event label from event labels 402, as shown in FIG. 4.

As just mentioned, each node in the depicted TNN 424 represents an electronic neuron, such as the depicted neuron 409. As shown in block 411, each neuron (including neuron 409) includes at least four features: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the TNN 424 to be further "fine tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the TNN 424, such that a reliable output will result from output layer 407. Such adjustments are alternatively performed manually or automatically.

When manually adjusted, the weights and/or biases are adjusted by the user in a repeated manner until the output from output layer 407 matches expectations. For example, assume that input layer 403 receives inputs from Public Person A descriptor data 400 that describes a change in a physical location of Public Person A between time T1 and time T2. Assume further that input layer 403 receives inputs from Public Person B descriptor data 401 that describes a change in a physical location of Public Person B between time T1 and time T2. If TNN 424 has been properly trained (by manually adjusting the mathematical function(s), output value(s), weight(s), and biases in one or more of the electronic neurons within TNN 424) to output a correct output vector (e.g., a 2-tuple output vector of 0.9, 0.2) to the output layer 407, then the neuron 404 for Event A (e.g., a meeting to discuss trade agreements) has the highest value (0.9). Furthermore, the TNN 424, when properly trained, gives a value of 0.2 to neuron 406, indicating that Event B (e.g., a surprise birthday party) is the incorrect label for the event based on the inputs from Public Person A descriptor data 400 and Public Person B descriptor data 401.

Thus, a properly trained TNN 424 will output a value from neuron 404 that is higher than the value from other neurons in the output layer 407 based on the interactions between the neurons in input layer 403 and hidden layers 405 and output layer 407 and the data that is input into the input layer 403. That is, the neurons in TNN 424 are manually adjusted such that when certain types of data are input into the TNN 424 (e.g., persons traveling to new locations; persons meeting with certain types of other persons, etc.), then neuron 404 has the highest output value when the input data suggests that there is a meeting occurring between those persons, but neuron 406 has the highest output value when the input data suggests that another event (e.g., a surprise birthday party) is being attended by those persons.

When automatically adjusted, the weights (and/or mathematical functions) are adjusted using "back propagation", in which weight values of the neurons are adjusted by using a "gradient descent" method that determines which direction each weight value should be adjusted to. For example, if the output from neuron 404 is just 0.5 and the output from neuron 406 is also 0.5, but the output from the neuron 404 (which is associated with Event A, such as a trade meeting) should be higher than any other neuron from the output layer 407, then the output from neuron 404 is manually changed to a high value (e.g., 0.9) and the output of neuron 406 is changed to 0.2 or smaller. The back propagation gradient descent process moves the weight and/or bias in each neuron in a certain direction until the output from output layer 407 improves (e.g., gets closer to outputting a highest value to neuron 404, thus indicating that the hidden Event A is the correct event that is indicated by the inputs from Public Person A descriptor data 400 and Public Person B descriptor data 401).

A CNN is similar to a TNN in that both utilize interconnected electronic neurons. However, a CNN is different from a TNN in that 1) a CNN has neural layers whose sizes are based on filter sizes, stride values, padding values, etc., and 2) a CNN utilizes a convolution scheme to analyze image data. A CNN gets its "convolutional" name based on a convolution (i.e., a mathematical operation on two functions to obtain a result) of filtering and pooling pixel data (a mathematical operation on two functions) in order to generate a predicted output (obtain a result).

Figure 5:
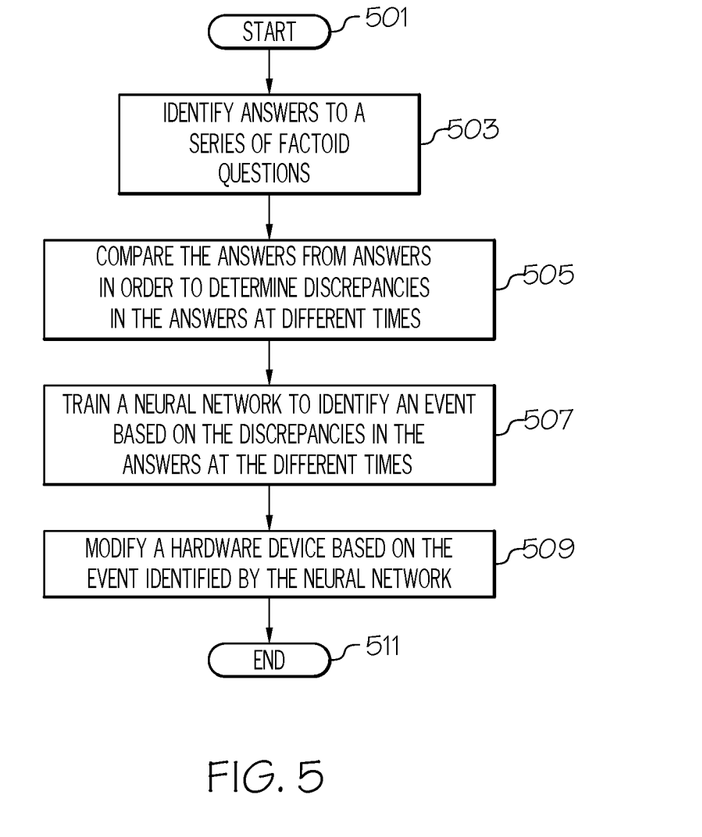
FIG. 5 is a high-level flow chart of one or more steps performed in accordance with one or more embodiments of the present invention.

With reference now to FIG. 5, a high-level flow chart of one or more embodiments of the present invention is presented.

After initiator block 501, one or more processors (e.g., processor 104 shown in FIG. 1) identifies identifying answers (e.g., Ai, which is the series A1, A2 . . . An) to a series of factoid questions (e.g., Qi, which is the series Q1, Q2 . . . Qn), as depicted in block 503. For example, the processor(s) identify, from a set of public documents such as news reports, the answer A1 to question Q1, the answer A2 to question Q2, etc.

As described in block 505, the processor(s) compare the answers from answers Ai in order to determine discrepancies (D'i) in the answers Ai at different times (Tij). For example, the processors determine that answer A1 had changed (discrepancy D'1) between time T1 and T2 (different times Tij).

As described in block 507, the processors train a neural network (e.g., TNN 424 shown in FIG. 4) to identify an event based on the discrepancies (D'i) in the answers (Ai) at the different times (Tij). That is, the mathematical functions, weights, and/or biases in the neurons in the neural network are adjusted, manually or automatically using back propagation, such that the event (e.g., Event A shown in FIG. 4) is prominent (i.e., neuron 404 has the highest value) in the output layer 407 of the TNN 424 when certain data describing actions by certain public persons are input into the input layer 403 of the TNN 424.

As described in block 509, in an embodiment of the present invention, once the (previously hidden) event is identified by the neural network, a user and/or processor(s) modify a hardware device based on the event identified by the neural network (see FIG. 3).

The flow chart shown in FIG. 5 ends at terminator block 511.

In an embodiment of the present invention, the event is an arrival of one or more specific persons at a particular location, and the hardware device is a traffic control device at the particular location (see FIG. 3).

In an embodiment of the present invention, the event is an arrival of one or more specific persons at a particular location, and the hardware device is a physical facility access control device for a physical facility at the particular location (see FIG. 3).

In an embodiment of the present invention, the event is an arrival of one or more specific persons at a particular location, and the hardware device is a communications control device at the particular location (see FIG. 3).

In an embodiment of the present invention, the event is an arrival of one or more specific persons at a particular location, and the hardware device is a camera control device at the particular location (see FIG. 3).

In an embodiment of the present invention, the event is an arrival of one or more specific persons at a particular location, and the hardware device is a remote storage device associated with the one or more specific persons (see FIG. 3).

In an embodiment of the present invention, the event is an arrival of one or more specific persons at a particular location, and the hardware device is a remote computing device associated with the one or more specific persons (see FIG. 3).

In an embodiment of the present invention, processor(s) identify passages (e.g., Pi, which is includes the series P1, P2 . . . Pn) in answers (Ai, which are an initial set of answers to the series of factoid questions) that are relevant to the series of factoid questions (Qi), where a particular passage within the passages (Pi) references a passage that is relevant to a particular question from the series of questions (Qi). For example, a passage P1 ("Public Person A") and passage P2 ("is in Country A") in answer A1 ("Public Person A is in Country A") are identified by the processor(s) as being relevant to question Q1 ("Where is Public Person A?").

Thereafter, the processor(s) separate each passage (Pi) from answers (Ai) into a temporal passage ordering (Pij), where the temporal passage ordering (Pij) is composed of passages that are submitted at corresponding times from the different times (Tij). For example, passage P2 from answer A1 changes from "Public Person A is in Country A" to "Public Person A is in Country C" between times T1 and T2 (which together are different times T12). As such, each passage Pi (e.g., passage P2) from answers Ai (e.g., answer A1) is separated into a temporal passage ordering (Pij) (e.g., passage P2 at time T1 and then passage P2 at time T2), where the temporal passage order (Pij) is composed of passages that are submitted at corresponding times from the different times (Tij).

The processor(s) then identify time-corresponding answers (A'ij) from the initial set of answers (Ai) that are associated with the corresponding times from the different times (Tij). For example, answer A1 at time T2 (one of the time-corresponding answers A'ij) is associated with answer A1 at time T1 (one of the initial set of answers—Ai).

The processor(s) compare the answers from time-corresponding answers (A'ij) to answers from the answers (Ai) in order to determine the discrepancies (D'i) at one or more times from times Tij. For example, the answer A11 (from A'ij) at time T2 is different (discrepancy D1) from answer A1 (from Ai) at time T1.

The processor(s) apply a statistical analysis to one or more discrepancy from the discrepancies (D'i) in order to identify a time (Tj) at which a discrepancy between one or more of the time-corresponding answers (A'ij) and one or more of the initial set of answers (Ai) exceeds a predetermined significance threshold. That is, the statistical analysis of discrepancies (D'i) identifies a specific time (Tj) at which the discrepancy between the time-corresponding answers (A'ij) and the initial set of answers (Ai) become significant (exceeds a predetermined significance threshold). For example, if the discrepancy is a person traveling from one street to another, this is deemed to be insignificant. However, if the discrepancy is a person traveling from one country to another, this is deemed to be significant. The determination as to whether or not the travel/action/movement/etc. by the person is significant is determined by a set of rules established by the user and/or the system. In this example, the rule is "If the person travels from one country to another country, this event is significant".

In response to identifying the time (Tj) at which the discrepancy between one or more of the time-corresponding answers (A'ij) and one or more of the initial set of answers (Ai) exceeds the predetermined significance threshold, the processor(s) associate the event that is based on the discrepancies (D'i) in the initial set of answers (Ai) with the time (Tj). For example, if the discrepancy is the person traveling from one country to another country, then the processors implement a rule such as "If a person travels from one country to another country, then that person is traveling for a meeting" (the associated event).

The processor(s) then train the neural network to identify the time (Tj) from the different times (Tij) at which the discrepancy between the time-corresponding answers (A'ij) and the initial set of answers (Ai) exceeds the predetermined significance threshold. That is, by training the neural network (see FIG. 4) how to recognize when the discrepancy occurs, then the system can associate that time and discrepancy with the "hidden" event.

Thus, one or more embodiments of the present invention provide a method and/or system for identifying hidden events through continuous corpus monitoring using sliding temporal windows and determining inconsistent answers between corpus subsets. In an embodiment of the present invention, these hidden event(s) are then analyzed by an analyst, who confirms what the hidden event is. This confirmation is then used to train a neural network by forcing an output of a neuron in the neural network (e.g., the output of neuron 404 shown in FIG. 4) to be higher than the output of other neurons in the output layer 407.

In an embodiment of the present invention, a system receives a series of questions (e.g. a series of questions Qi) (Q1, Q2, . . . , Qn) and identifies answers Ai (A1, A2, . . . , An) to the series of questions Qi. The system identifies passages Pi (P1, P2, . . . , Pn) in the answers from answers Ai that are relevant to the series of questions Qi, where each passage from Pi references an answer to one or more of the questions Qi.

The system separates each passage from passages Pi into a temporal ordering of Pij (Pi1, Pi2, . . . , Pim), which are passages submitted (e.g., written, published, posted, etc.) at times Tij (Ti1, Ti2, . . . , Tim); identifies answers A'ij (A'i1, A'i2, . . . , A'im) associated with the ordering at times Tij; and compares the answers A'ij to the answers Ai in order to determine a discrepancy D'i at the times Tij.

The system then applies a statistical analysis to the discrepancies D'i and, responsive to identifying a time Tj with a discrepancy between answers in A'ij and Ai that exceed a predetermined significance threshold, identify an event associated with the time Tj.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
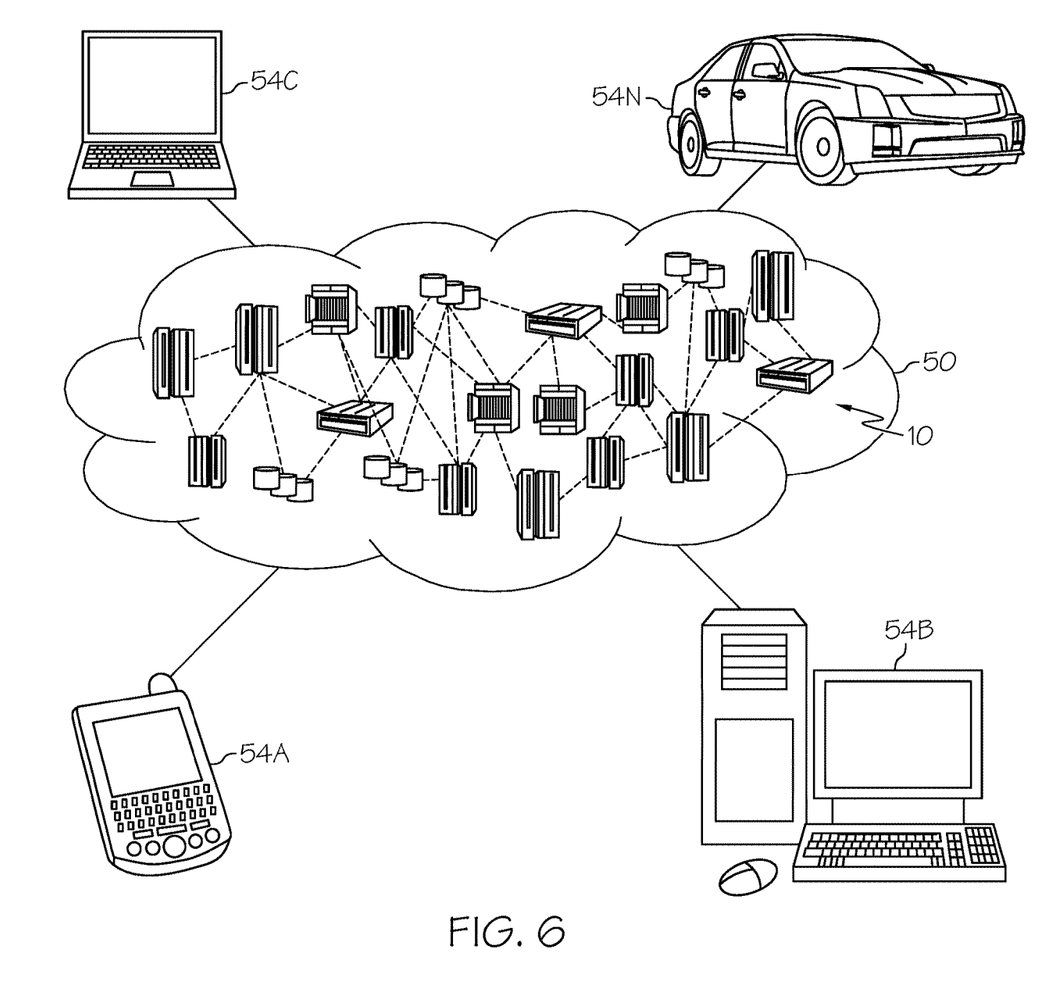
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
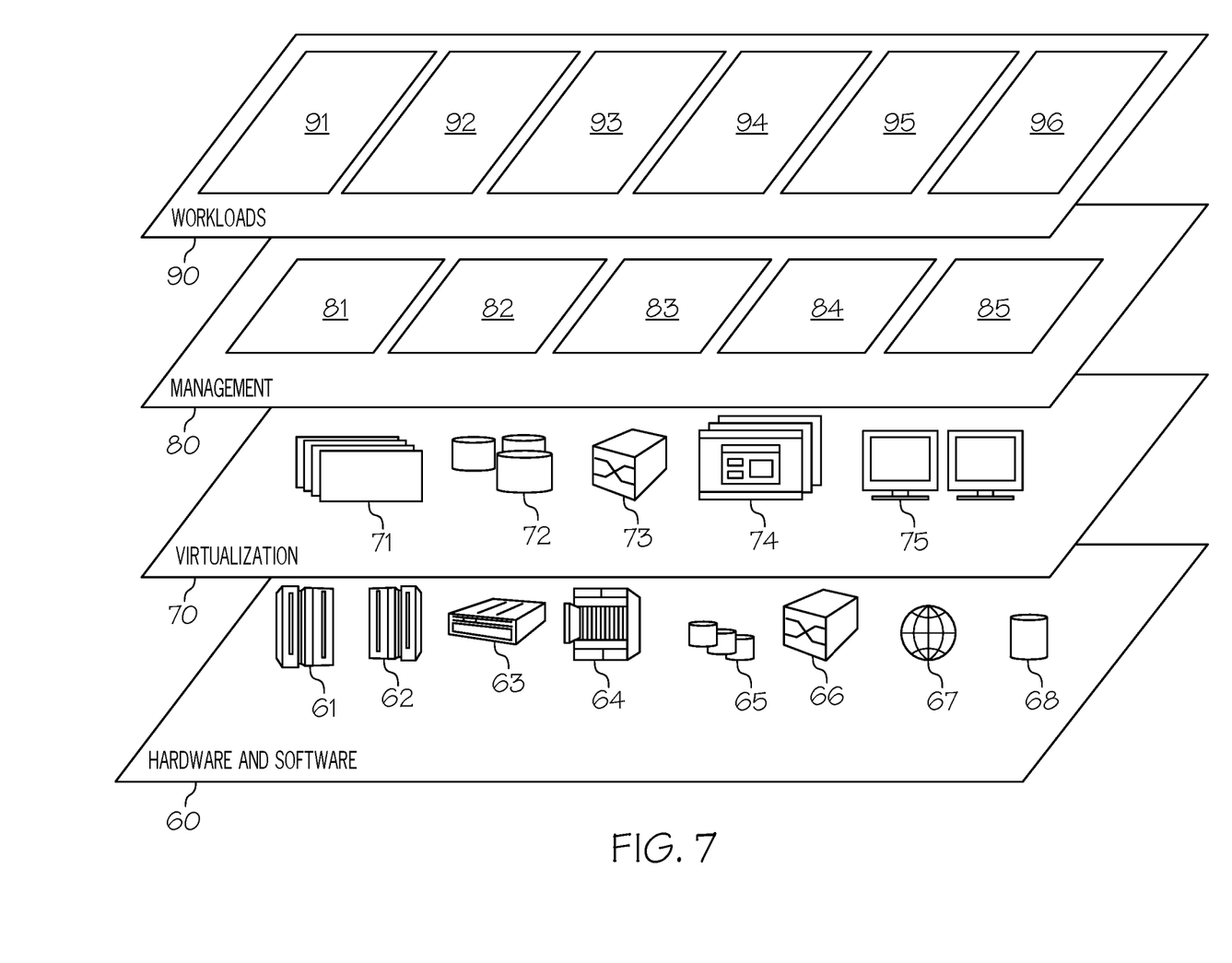
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and neural network training processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   identifying, by one or more processors, passages in an initial set of answers that are relevant to a series of factoid questions;
   separating, by the one or more processors, each passage from the initial set of answers into a temporal passage ordering;
   identifying, by the one or more processors, time-corresponding answers from the initial set of answers that are associated with the corresponding times from different times;
   comparing, by the one or more processors, the time-corresponding answers to the initial set of answers in order to determine the discrepancies at one or more times from the different times;
   applying, by the one or more processors, a statistical analysis to one or more discrepancies from the discrepancies in order to identify a time at which a discrepancy between one or more of the time-corresponding answers and one or more of the initial set of answers exceeds a predetermined significance threshold;
   in response to identifying the time at which the discrepancy between the one or more of the time-corresponding answers and the one or more of the initial set of answers exceeds the predetermined significance threshold, associating, by the one or more processors, an event that is based on the discrepancies in the initial set of answers with the time; and
   training, by the one or more processors, a neural network to identify the time from the different times at which the discrepancy between the time-corresponding answers and the initial set of answers exceeds the predetermined significance threshold.

2. The method of claim 1, further comprising:
   modifying a hardware device based on the event identified by the neural network.

3. The method of claim 2, wherein the event is an arrival of one or more specific persons at a particular location, and wherein the hardware device is a traffic control device at the particular location.

4. The method of claim 2, wherein the event is an arrival of one or more specific persons at a particular location, and wherein the hardware device is a physical facility access control device for a physical facility at the particular location.

5. The method of claim 2, wherein the event is an arrival of one or more specific persons at a particular location, and wherein the hardware device is a communications control device at the particular location.

6. The method of claim 2, wherein the event is an arrival of one or more specific persons at a particular location, and wherein the hardware device is a camera control device at the particular location.

7. The method of claim 2, wherein the event is an arrival of one or more specific persons at a particular location, and wherein the hardware device is a remote storage device associated with the one or more specific persons.

8. The method of claim 2, wherein the event is an arrival of one or more specific persons at a particular location, and wherein the hardware device is a remote computing device associated with the one or more specific persons.

9. The method of claim 1, further comprises:
wherein a particular passage within the passages is relevant to a particular question from the series of factoid questions; and
wherein the temporal passage ordering is composed of passages that are submitted at corresponding times from the different times.

10. A computer program product comprising a computer readable hardware storage medium having program code embodied therewith, wherein the computer readable hardware storage medium is not a transitory signal per se, and wherein the program code is readable and executable by a processor to perform a method comprising:
identifying passages in an initial set of answers that are relevant to a series of factoid questions;
separating each passage from the initial set of answers into a temporal passage ordering;
identifying time-corresponding answers from the initial set of answers that are associated with the corresponding times from different times;
comparing the time-corresponding answers to the initial set of answers in order to determine the discrepancies at one or more times from the different times;
applying a statistical analysis to one or more discrepancies from the discrepancies in order to identify a time at which a discrepancy between one or more of the time-corresponding answers and one or more of the initial set of answers exceeds a predetermined significance threshold;
in response to identifying the time at which the discrepancy between the one or more of the time-corresponding answers and the one or more of the initial set of answers exceeds the predetermined significance threshold, associating an event that is based on the discrepancies in the initial set of answers with the time;
training a neural network to identify the time from the different times at which the discrepancy between the time-corresponding answers and the initial set of answers exceeds the predetermined significance threshold; and
modifying a hardware device based on the event identified by the neural network.

11. The computer program product of claim 10, wherein the method further comprises:
wherein a particular passage within the passages is relevant to a particular question from the series of factoid questions; and
wherein the temporal passage ordering is composed of passages that are submitted at corresponding times from the different times.

12. The computer program product of claim 10, wherein the event is an arrival of one or more specific persons at a particular location, and wherein the hardware device is a traffic control device at the particular location.

13. The computer program product of claim 10, wherein the event is an arrival of one or more specific persons at a particular location, and wherein the hardware device is a physical facility access control device for a physical facility at the particular location.

14. The computer program product of claim 10, wherein the event is an arrival of one or more specific persons at a particular location, and wherein the hardware device is a communications control device at the particular location.

15. The computer program product of claim 10, wherein the event is an arrival of one or more specific persons at a particular location, and wherein the hardware device is a camera control device at the particular location.

16. The computer program product of claim 10, wherein the event is an arrival of one or more specific persons at a particular location, and wherein the hardware device is a remote computing device associated with the one or more specific persons.

17. The computer program product of claim 10, wherein the program code is provided as a service in a cloud environment.

18. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
identifying passages in an initial set of answers that are relevant to a series of factoid questions;
separating each passage from the initial set of answers into a temporal passage ordering;
identifying time-corresponding answers from the initial set of answers that are associated with the corresponding times from different times;
comparing the time-corresponding answers to the initial set of answers in order to determine the discrepancies at one or more times from the different times;
applying a statistical analysis to one or more discrepancies from the discrepancies in order to identify a time at which a discrepancy between one or more of the time-corresponding answers and one or more of the initial set of answers exceeds a predetermined significance threshold;
in response to identifying the time at which the discrepancy between the one or more of the time-corresponding answers and the one or more of the initial set of answers exceeds the predetermined significance threshold, associating an event that is based on the discrepancies in the initial set of answers with the time;
training a neural network to identify the time from the different times at which the discrepancy between the time-corresponding answers and the initial set of answers exceeds the predetermined significance threshold; and modifying a hardware device based on the event identified by the neural network.

19. The computer system of claim 18, wherein the method further comprises:
wherein a particular passage within the passages is relevant to a particular question from the series of factoid questions; and
wherein the temporal passage ordering is composed of passages that are submitted at corresponding times from the different times.

20. The computer system of claim 18, wherein the stored program instructions are provided as a service in a cloud environment.

* * * * *